United States Patent [19]

Pence et al.

[11] 4,447,353

[45] May 8, 1984

[54] METHOD FOR TREATING A NUCLEAR PROCESS OFF-GAS STREAM

[75] Inventors: Dallas T. Pence; Chun-Chao Chou, both of San Diego, Calif.

[73] Assignee: The United States of America as represented by the United States Department of Energy, Washington, D.C.

[21] Appl. No.: 186,303

[22] Filed: Sep. 11, 1980

Related U.S. Application Data

[63] Continuation of Ser. No. 63,970, Aug. 6, 1979.

[51] Int. Cl.³ ..................... B01J 20/18; B01D 53/04
[52] U.S. Cl. ........................... 252/630; 55/66; 55/75; 55/71; 55/76; 423/219; 423/230; 423/239
[58] Field of Search ..................... 423/219, 230, 239; 55/66, 75, 71, 76; 252/630

[56] References Cited

U.S. PATENT DOCUMENTS

| | | | |
|---|---|---|---|
| 3,279,884 | 10/1966 | Nonnenmacher | 423/239 |
| 3,476,508 | 11/1969 | Kearby | 423/239 |
| 3,767,764 | 10/1973 | Dolbear | 423/213.7 |
| 3,806,583 | 4/1974 | Dewell | 55/66 |
| 3,944,646 | 3/1976 | Martin | 252/630 |
| 4,012,490 | 3/1977 | Lofredo | 252/630 |
| 4,055,625 | 10/1977 | Faugeras et al. | 252/630 |
| 4,087,375 | 5/1978 | Tanno | 252/630 |
| 4,088,737 | 5/1978 | Thomas et al. | 252/630 |
| 4,093,429 | 6/1978 | Siegler et al. | 55/66 |
| 4,369,048 | 1/1983 | Pence | 55/66 |

OTHER PUBLICATIONS

Rees et al., "Sorption of Krypton and Fast Neutron Irradiation Damage in Synthetic Mordenite and Synthetic Faujasite", Chemical Abstracts, vol. 71 (1969), #64457c.

Primary Examiner—Brooks H. Hunt
Attorney, Agent, or Firm—Allen F. Westerdahl; Michael F. Esposito

[57] ABSTRACT

Disclosed is a method for selectively removing and recovering the noble gas and other gaseous components typically emitted during nuclear process operations. The method is adaptable and useful for treating dissolver off-gas effluents released during reprocessing of spent nuclear fuels whereby to permit radioactive contaminant recovery prior to releasing the remaining off-gases to the atmosphere. Briefly, the method sequentially comprises treating the off-gas stream to preliminarily remove $NO_x$, hydrogen and carbon-containing organic compounds, and semivolatile fission product metal oxide components therefrom; adsorbing iodine components on silver-exchanged mordenite; removing water vapor carried by said stream by means of a molecular sieve; selectively removing the carbon dioxide components of said off-gas stream by means of a molecular sieve; selectively removing xenon in gas phase by passing said stream through a molecular sieve comprising silver-exchanged mordenite; selectively separating krypton from oxygen by means of a molecular sieve comprising silver-exchanged mordenite; selectively separating krypton from the bulk nitrogen stream using a molecular sieve comprising silver-exchanged mordenite cooled to about $-140°$ to $-160°$ C.; concentrating the desorbed krypton upon a molecular sieve comprising silver-exchange mordenite cooled to about $-140°$ to $-160°$ C.; and further cryogenically concentrating, and the recovering for storage, the desorbed krypton.

4 Claims, 1 Drawing Figure

METHOD FOR TREATING A NUCLEAR PROCESS OFF-GAS STREAM

CROSS-REFERENCE TO RELATED APPLICATIONS

The present application is a continuation of U.S. Ser. No. 063,970, filed Aug. 6, 1979.

BACKGROUND OF THE INVENTION

The present invention relates to nuclear process off-gas treatment systems, and more particularly to a method for selectively removing and recovering for longterm storage, if necessary, the noble gas and other gaseous components typically emitted during nuclear process operations. The described method is adaptable and useful, for example, in treating the dissolver off-gas effluents released during reprocessing of spent nuclear fuels whereby to permit radioactive contaminant recovery prior to releasing the remaining off-gases to the atmosphere.

Activation and fission products are released and become airborne during nuclear fuel reprocessing of light water reactor fuels. Certain of these products are long-lived and, accordingly, represent a serious hazard to people if the products are released directly into the local environment. The products of primary concern are tritium, carbon-14, krypton-85, iodine-129, and some of the fission product semivolatile metal oxides such as ruthenium, technetium, and antimony. Iodine-131 may also be present in hazardous amounts if the spent nuclear fuel is reprocessed within about 180 days following reactor discharge. In most instances the radioxenons will have decayed prior to fuel reprocessing.

Various methods have been used and proposed which influence the distribution of airborne radioactive contaminants carried in the reprocessing off-gas stream. Some methods propose a preliminary heat-treatment step following shearing of the spent fuel bundles whereby to release a large fraction of the volatile activation and fission product gases. Most of the remaining volatile gases are subsequently released during the fuel dissolution step. In the methods employing a heat-treatment step three off-gas streams containing activation and fission product gases are released: (1) an off-gas stream from the heat-treatment step; (2) an off-gas stream released from the dissolver; and (3) an off-gas stream from the various vessels comprising the remainder of the fuel reprocessing system.

Where a heat treatment step is included in the design of an off-gas treatment system, essentially all of the tritium and appreciable quantities of the iodine and noble gases will be released to the heat-treatment step off-gas stream. Due to the high concentration of tritium in this off-gas stream, the most practical approach is to remove the tritium, and possibly the iodine, and then return the noble gases and other carbon-containing gases that may be present to the off-gas stream released from the dissolver. If a heat-treatment step is not included in the method, the tritium will be released during dissolution of the fuel and most of the tritium will exchange with the nitric acid dissolver solution. Noble gases present in the dissolver will be quantitatively released to the dissolver off-gas stream. Most of the carbon-14 containing compounds, the majority of which are in the form of carbon dioxide, and greater than 95% of the iodine will also be released to the dissolver off-gas stream.

Those activation and fission product species not released during dissolution will follow the aqueous phase of the solvent extraction system and will be released to the various vessel vents which make up the vessel off-gas stream. Some iodine admixed with these species may eventually reach the high-level liquid waste tanks.

Two main processes have been proposed or used for recovering noble gases, and in particular noble gases present in the dissolver off-gas stream: cryogenic distillation and flourocarbon adsorption. These processes are reviewed and discussed in U.S. ERDA "Airborne Waste Recovery and Immobilization" *Alternatives for Managing Wastes from Reactors and Post-Fission Operations in the LWR Fuel Cycle*, ERDA-76/43, Volume II, May 1976.

There are several versions of the cryogenic distillation method that differ primarily in their approach to removing contaminant gases, other than xenon and krypton, in a nitrogen carrier gas stream. These processes have been described at several recent conferences and in publications promulgated to the various participants. IAEA, *Proceedings of International Symposium on the Management of Radioactive Wastes from the Nuclear Fuel Recycle*, Vienna, Austria, 22–26 March 1976; and M. W. First, Ed., *Proceedings of the 15th DOE Nuclear Air Cleaning Conference*, 7–10 August 1978, Boston, Mass., CONF 780819, February 1979.

To prevent the freeze-out and plugging of contaminant gases in a cryogenic distillation unit, an efficient pre-treatment contaminant gas-clean-up must be used. Generally, contaminant gases, such as $CO_2$, $NO_x$ (including $N_2O$, $NO$, $NO_2$, and $N_2O_4$), and various hydrocarbons, must be removed to about 1 ppm. to ensure trouble-free operation. Because of the potential hazard of ozone, a radiolysis product of oxygen in high radiation fields caused by concentrated krypton-85, the oxygen concentration in the off-gas stream should be kept low. J. F. Riley, "Radiolysis of Liquid Oxygen and Oxygen-Nitrogen at 77° K.," *Chemistry Division Annual Progress Report for Period Ending* June 20, 1963, ORNL-3488.

The fluorocarbon adsorption process for noble gas separation from reprocessing plant off-gas effluents is less developed. Although pilot-scale testing has been performed, a complete description, including the disposition of all the collected products and the expected system decontamination factors (DFs), has not yet appeared.

Yet another method, cryogenic selective adsorption-desorption, has been proposed for the removal of noble gases. T. Kanazawa, et al., "Development of the Cryogenic Selective Adsorption-Desorption Process on Removal of Radioactive Noble Gases," *Proceedings of the 14th ERDA Air Cleaning Conference*, 2–4 August, 1976, Sun Valley, Idaho, CONF-760822, February 1977.

SUMMARY OF THE INVENTION

In accordance with the present invention, noble gases, in particular xenon and krypton, present in a nuclear process off-gas stream may be selectively removed in gas phase. This generic form of the invention is adaptable and useful in an integrated process for effecting the treatment of off-gas effluents released during nuclear fuel reprocessing. Briefly, the integrated process comprises: (a) passing the dissolver off-gas stream through a $NO_x$ adsorption column wherein $NO_2$ is caused to react with water to produce NO and nitric acid; (b) destruction of the NO and remaining $NO_x$ components upon a hydrogen form synthetic mordenite catalyst heated to about 375° C. and using ammonia as a reducing gas; (c) adsorption of iodine on silver-exchanged and reduced synthetic mordenite catalyst material at a temperature of about 100°–150° C.; (d) removing excess moisture present in the off-gas stream by first cooling the gas to about 35° C. and then selectively removing the remaining water by passing said stream through an adsorbent bed of Type 3A zeolite; (e) selectively removing the carbon dioxide component of said off-gas stream by passing said stream through a Type 4A zeolite; (f) selectively removing xenon in gas phase by passing said off-gas stream through an adsorbent bed of silver-exchanged mordenite; (g) selectively separating krypton from oxygen utilizing the technique of rapid cycle adsorption through a multiplicity of silver-exchanged mordenite adsorbent beds; (h) selectively adsorbing krypton from the bulk nitrogen stream using an adsorbent bed of silver-exchanged mordenite cooled to about −140° to −160° C.; (i) concentrating the desorbed krypton upon an adsorbent bed of silver-exchanged mordenite cooled to about −140° to −160° C.; and (j) further concentrating the desorbed krypton by means of a liquid nitrogen cooled krypton freeze-out trap. Thus, krypton gas collected from the krypton freeze-out trap can be recovered in steel storage cylinders or incorporated into some other type of long-term storage device.

The present invention possesses several advantages, among which is that the production of liquid waste is significantly reduced. Yet another advantage is that the majority of process steps are carried out at about ambient temperature and pressure. Still further, the sequence of steps to be performed in practicing the process has been selected to ensure the compatability of each step with all subsequent process steps. In this manner the overall efficiency of the process to treat a nuclear process off-gas stream is significantly increased.

BRIEF DESCRIPTION OF THE DRAWINGS

The details of the present invention will be described in connection with the accompanying drawing, in which.

DETAILED DESCRIPTION OF THE PREFERRED EMBODIMENT

Figure 1:
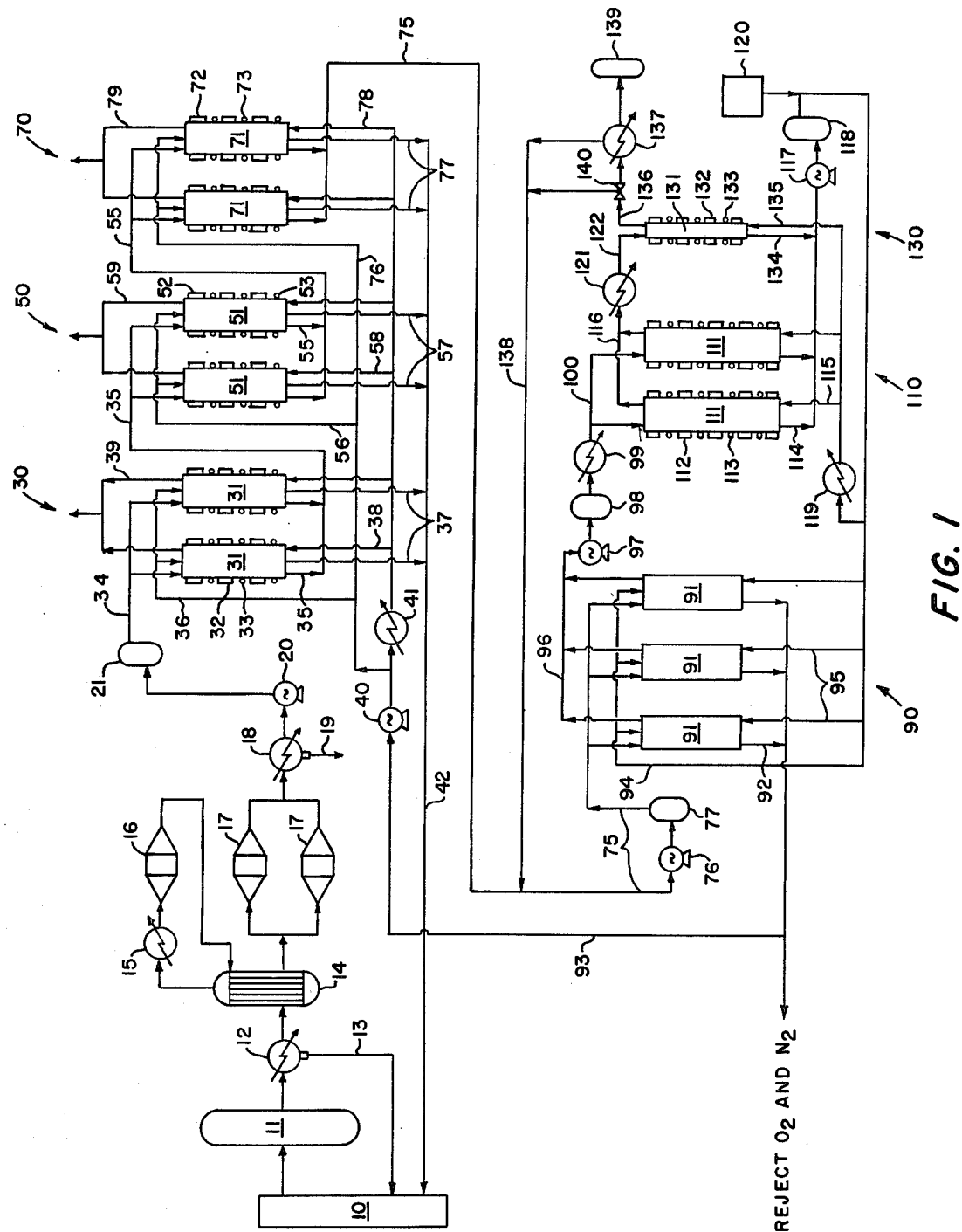
FIG. 1 is a diagrammatic view of the process adapted for treating a dissolver unit off-gas stream.

So that the present invention is more readily understood, reference is now made to FIG. 1 which diagrammatically illustrates an integrated process for removing and recovering airborne activation and fission product radioisotopes released to a dissolver unit off-gas effluent stream during nuclear fuels reprocessing. While the process hereinafter disclosed here is primarily directed to dissolver off-gas effluents treatment, persons skilled in the art will readily comprehend that slight modification can be made thereto rendering the process compatible for treating, in addition, both heat-treatment and vessel off-gas effluent streams. Further, although the disclosure is primarily directed to the treatment of light water reactor fuels reprocessing, the process is also applicable for liquid metal fuel breeder reactor fuel reprocessing as well as, with slight modifications, to other nuclear reactor fuels reprocessing. Therefore, it is intended that the following description of the process not be read or interpreted in a limiting sense.

To prevent interference with the various selective adsorption steps hereafter described, it is preferred that the oxides of nitrogen included within the dissolver off-gas effluents stream first be removed. Therefore, the various off-gases released from the depicted dissolver unit 10 are initially directed through an $NO_x$ adsorption column 11 and condenser 12 wherein a major portion of $NO_2$ is converted to NO and nitric acid by reaction with water, these reaction products being recycled through line 13 back to dissolver unit 10. The remaining off-gas effluents, including residual $NO_2$ and major amounts of NO, are then directed through an interchanger 14 and heater 15 prior to entering an $NO_x$ destructor 16.

The $NO_x$ components entering destructor 16 are catalytically reduced to nitrogen and water. The manner by which said components are catalytically reduced is more fully disclosed in Pence et al., U.S. Pat. No. 4,220,632, issued Sept. 2, 1980. Briefly, reduction occurs by passing the off-gases over a bed of hydrogen-form synthetic mordenite, maintained at about 400° C., and using ammonia as a reducing gas.

Volatization of most semivolatile fission products results from the strong oxidizing conditions existing during the dissolution phase of reprocessing. Thus, it was believed that most, if not all, of these volatized oxides would also become reduced when exposed to the reducing environment within $NO_x$ destructor 16. It has been confirmed by observation that certain of these fission product oxides, including ruthenium, technetium, and antimony, plate out onto the mordenite catalyst bed. Similarly, the destructor 16 reducing atmosphere also acts to oxidize certain of the hydrogen and carboncontaining organic compounds present in the off-gas stream to $H_2O$ and $CO_2$, respectively.

Following catalytic reduction within destructor 16, the remaining off-gas effluents are redirected through interchanger 14 wherein they are cooled to about 150° C., interchanger 14 simultaneously heating the feed gas to $NO_x$ destructor 16 by heat transfer. The cooled off-gases exiting interchanger 14 next enter an iodine adsorbent bed 17 wherein the radioiodines, including iodine-129 and trace quantities of iodine-131, are removed. Adsorbent beds 17 may beneficially comprise either silver-exchanged zeolite, either in the ionic reduced form, or silver-impregnated amorphous silicic acid catalyst material. Because the most suitable operating temperature for using these materials is about 100° to 150° C., the off-gases from destructor 16 are first cooled in interchanger 14 prior to passing through an iodine adsorbent bed 17.

Preferably two iodine adsorbent beds 17 are used in parallel, one of said beds being on line to receive off-gas from interchanger 14 while the other of said beds is either being replaced when spent, in standby condition, or in the process of being regenerated by a method such as that taught in T. R. Thomas, et al., *Airborne Elemental Iodine Capacities of Metal Zeolites and a Method for Recycling Silver Zeolite,* ICP-1119, July 19, 1977. Little, if any, of the remaining activation or fission product gases are retained on iodine adsorbent beds 17 when said beds are maintained at a temperature of about 150° C.

The effluents from adsorbent beds 17 are next cooled within condenser 18 to about ambient temperature, and the water from the $NO_x$-$NH_3$ reaction removed through line 19. Because the water removed from condenser 18 is tritium contaminated, the removed water may be either stored or alternatively recycled back to the dissolver unit 10.

At this point in the process the average composition of the off-gases exiting condenser 18 is approximately as follows: 56,000 ppm. $H_2O$ (assuming the cooler condenser temperature is approximately 35° C.); 2,500 ppm. xenon; 300 ppm. $CO_2$; 250 ppm. krypton; 20% $O_2$, 1% argon; and the balance nitrogen. These concentrations are given as averages; however, the concentrations will vary considerably depending upon the type of dissolver, continuous or batch, and the time for the dissolution cycle.

The off-gas effluents exiting condenser 18 are next directed through line 34 to water vapor removal means 30, said means comprising at least two water removal columns 31, or the like, disposed therethrough with an adsorbent preferentially adsoptive towards water vapor. Separation of water is obtained using conventional adsorption-desorption technology at essentially ambient temperature and pressure. What is meant by conventional adsorption-desorption technology is that the comtaminant-containing gas is passed through a column, or the like, containing the selective adsorbent material and one of the contaminants is selectively adsorbed while the remaining gases readily pass therethrough. When the adsorbent bed nears saturation, the feed-gas stream is shifted to a standby column, and the loaded column is then heated and the collected contaminant gas purged from the heated adsorbent bed with air. The recovered contaminant gas is then in a highly concentrated form which can either be recovered or fixed for long-term or permanent disposal.

Inasmuch as the effluents flow rate from dissolver 10 may be quite nonuniform, depending upon the type of dissolution technique, relatively uniform flow of the effluents exiting condenser 18 is obtained by interposing a blower 20 to compress the effluents to several psi. within surge tank 21. A flow regulator (not shown) is used to ensure a uniform discharge from surge tank 21. Of course, blower 20 and surge tank 21 may be interposed at different positions within the process scheme, such as upstream of the $NO_x$ destructor 16, depending upon the preferred operation of the $NO_x$ destructor 16 and iodine adsorbent beds 17. While the uniform flow rate of the effluents from condenser 18 is not critical, the determination of the most efficient operation for the subsequent stages in the process is easier to calculate with uniform feed rates.

The feed rate to a water removal column 31 should be such that the actual face velocity of the gases through column 31 is about 9.15 m./min. when the adsorbent material is in the particle diameter size range of about 10–20 mesh (U.S. Standard). The adsorbent material used for selective water removal is a Type 3A Zeolite molecular sieve which will also coadsorb approximately 10% of the $CO_2$ present, but does not co-adsorb any of the other gaseous constituents to any appreciable extent (less than 1 ppm.). The dissolver off-gas flow rate will vary considerably depending upon the size and design of the reprocessing facility, but for a facility with a dissolver off-gas rate of about 3.0 m.$^3$/min., the diameter of the water removal columns 31 would be approximately 0.61 meters. Using these design parameters, average concentrations of $H_2O$ in the effluent from a water removal column 31 will be less than 1.0 ppm. At the stated conditions, a 0.915 meter long adsorbent bed for water removal columns 31 would effectively remove water from the feed stream for about 6 hours before regeneration would be necessary. 1.22 to 1.83 meter long columns would be more suitable lengths for greater regeneration times.

At the completion of the loading cycle for one of the columns 31, the feed stream through line 34 is transferred to a standby column 31, and a purge flow of air from blower 40 through line 36 is introduced into the saturated column 31 at approximately the same face velocity as for the feed gas and for a period of time of about 5 to 10 minutes. The forward purge and discharge lines, 36 and 37, respectively, are then closed and electrically activated column clamp heaters 32, or the like, turned on. The water removal column undergoing regeneration is vented through vent line 39. As the column 31 is heated to the desorption temperature of about 275° C., water vapor is released. When the mid-column temperature reaches approximately 275° C., the back-purged air supply line 38 is open and air from blower 40 is heated within heater 41 and passed through column 31 at a rate of approximately 1/15th that of the forward feed rate. The exact purge rates and times depend, of course, upon the specific design.

When the adsorbent in the water removal column 31 is completely desorbed, vent line 39 is closed, and the column 31 and adsorbent disposed therein cooled to ambient temperature by external water-cooled coils 33, or the like, wrapped and welded around columns 31 between clamp heaters 32. If the columns 31 are large, dry air through the back-purge line 38 may be introduced to cool the bed quickly enough to be ready for the next loading cycle.

The tritium-contaminated recovered water can either be recycled to dissolver 10 or solidified for long-term waste storage. Any $CO_2$ that was co-adsorbed with $H_2O$ should be recycled back to dissolver 10.

Beneficially, to prevent pressure surges downstream from columns 31 due to the introduction of forward-purge flow, the forward-purge gas and any residual off-gas effluents removed from columns 31 by the forward-purge cycle are directed by line 37 for recycle to dissolver 10 by way of line 42.

The outlet gas exiting water removal means 30 is next directed through line 35 to $CO_2$ removal means 50. Means 50 comprises at least two $CO_2$ removal columns 51, or the like, having column dimensions, operating conditions, and operating procedures substantially identical to those of water removal columns 31. The loading through line 35, forward-purging through line 56, venting through line 59, and back-purging through line 58 operations are the same. Similarly, pressure surges due to forward-purge flow may be accommodated in the system by directing said flow via line 57 back to dissolver unit 10. The only difference in these operations is that the loading times for column 51 are slightly longer for the same column dimension, and the required desorption temperatures are slightly reduced, to about 250° C.

A type 4A zeolite molecular sieve is used as the adsorbent in columns 51 for the selective adsorption of $CO_2$. It has been demonstrated that carbon dioxide will not break through a 0.915 meter long column for approximately 12 hours. The average concentrations of co-adsorbed xenon and krypton are less than 0.1 ppm. in the back purged $CO_2$ effluent.

Heating and cooling of the columns 52 is performed by means of external clamp heaters 52 and water cooled coils 53.

The CO₂ recovered through vent line 59 can be further concentrated in yet another adsorption step, solidified directly into a matrix compressed for steel-tank storage, or directly released to the atmosphere. However, because this gas stream will be enriched in carbon-14, a waste recovery procedure for the recovered CO₂ is preferred.

The outlet gas from CO₂ removal means 50 is next directed through line 55 to xenon removal means 70. Means 70 comprises at least two xenon removal columns 71, or the like, having dimensions, operating conditions, and operating procedures substantially identical to those used for the water removal columns 31 and CO₂ removal columns 51. The essential differences are the type of adsorbent utilized, the desorption temperature and the desorption procedure.

The adsorbent used for xenon separation is silver-exchanged synthetic mordenite. This material was prepared from a base material purchased from the Chemical Process Products Division, Norton Company, Akron, Ohio, and described in Bulletin Z50 of that company as Zeolon 900, hydrogen form. The Zeolon 900 material is a zeolite material composed of sodium silicates. The hydrogen form is that in which the sodium cations have been replaced with hydrogen ions. The Zeolon material was received as ⅛ in. diameter by ¼ to ⅜ in. long extrudate pellets. The material was ground and sieved to obtain an approximate gaussion particle distribution size in the range of about 10 to 20 $\mu$m. in diameter. The ground material was then water washed and batch wise exchanged with 1 M silver solution. Several exchanges were performed per patch until the silver-exchanged zeolite was about 15% by weight silver. After columns 71 were filled with the adsorbent, they were activated by heating to about 250° to 300° C. for at least 4 hours with a slow purge of dry oxygen. At the conclusion of the heat treatment, the columns were cooled with a purge stream of dry nitrogen.

In operation, a xenon removal column 71 remains on-line receiving off-gases from line 55 until the column is loaded, or nearly so, at which time the off-gas stream is shifted to an alternate column 71. In most applications the xenon will not be radioactive; therefore, the gas may have some commercial value. Due to the relatively weak interaction between xenon and the selected adsorbent, when compared with H₂O and CO₂ towards their respective adsorbents, the desorption temperature for xenon from column 71 is less, in the order of about 150° and 200° C. To reduce purge-gas dilution of the xenon adsorbed within a loaded column 71, the loaded column 71 is brought to the desorption temperature for xenon by external clamp heaters 72 and the adsorbed xenon is allowed to desorb for about 10 to 20 minutes before a heated back-purge gas flow through line 78 is commenced. The collected xenon-air gas stream exiting in column 71 through vent line 79 can then be collected by a freeze-out technique and compressed into steel cylinders (not shown) for further disposition. At the completion of the xenon desorption cycle, vent line 79 is closed and external water-cooled coils 73 utilized to cool the column back to adsorption temperature, about ambient.

As with the forward-purge cycles for water removal columns 31 and CO₂ removal columns 51, forward-purged gas through the xenon removal columns 71 exits therefrom through lines 77 for recycling to dissolver unit 10 by way of line 42.

When using a 5.08 cm. diameter and 0.915 m. long column, containing silver-exchanged synthetic mordenite zeolite, approximately 6 hour loading cycles have been determined to be satisfactory without appreciable xenon breakthrough to the outlet line 75. However, 1.22 to 1.83 m. long columns would be more appropriate to allow longer heating and cooling times. Krypton also coadsorbs on this adsorbent; however, a 15 minute forward-purge cycle reduces the average concentration of krypton in the recovered xenon to below 0.1 ppm.

The off-gas exiting columns 71 primarily comprises major amounts of concentrated krypton and air. Because ozone is formed through radiolysis when oxygen is exposed to high radiation fields caused by concentrated krypton-85, and further because of the potential explosive hazard of ozone, it is preferred to maintain a low concentration level of oxygen. Therefore, the integrated process next includes means 90 for separating oxygen from the off-gas stream carried by line 75. The terminology "oxygen removal means" is somewhat of a misnomer inasmuch as the gaseous component actually adsorbed therein is krypton. However, because the purpose of this step in the process is to effect the separation of oxygen from the off-gas stream, means 90 is accordingly identified by its intended purpose.

Oxygen separation means 90, comprising at least two absorbent columns 91, or the like, are provided to receive off-gases from xenon removal means 70. To ensure a uniform flow rate to the oxygen separation columns 91 from the feed gas line 75, blower 80 and surge tank 81 prevent the propagation of any sudden surges of flow than may result from upsets in the upstream dissolver off-gas flow.

Oxygen separation is accomplished by selectively adsorbing krypton on silver-exchanged synthetic mordenite, the same adsorbent used within xenon removal columns 71, by utilizing the art-known technique of rapid cycle adsorption. While krypton does not interact strongly with the silver-exchanged mordenite at ambient temperature and pressure, krypton breakthrough is inhibited a sufficient amount of time whereby to permit the majority of oxygen and nitrogen contained within the feed stream to pass through the columns 91. The weak interaction between krypton and the adsorbent material requires that the adsorption or feed cycle must be kept relatively short.

The dimensions of oxygen separation columns 91 are such that the linear face velocity of the feed gas through the column is approximately 9.15 m./min. for 10-20 mesh (U.S. Standard) adsorbent material. By way of example, for a 0.915 m. long column filled with the adsorbent, the separation of krypton from oxygen can be effected as follows: (1) a feed or adsorption cycle time at about 8.0 m./min. linear face velocity for about 3.0 minutes, (2) a forward-purge cycle using nitrogen as the purge gas at about 16.0 m./min. for about 0.5 minutes, and (3) a back-purge or desorption cycle with nitrogen at about 16.0 m./min. linear face velocity through column 91 for about 2.5 minutes.

The forward-purge through purge line 94 sweeps residual oxygen from the adsorbent interstices within column 91 and is effective in removing oxygen because oxygen does not co-adsorb to any appreciable extent. At the completion of the forward-purge, line 94 and column 91 discharge line 92 are closed and the column 91 vent line 96 and back-purge line 95 opened. Nitrogen is used for both the forward and back purge operations to prevent contamination of the recovered krypton with oxygen.

Because the desorption cycle for krypton is necessarily short, desorption by purge flow is used rather than desorption with the use of heat. This operation actually dilutes the krypton by approximately 67% because of the doubled face velocity of the back-purge nitrogen; however, the gas mixture exiting through vent line 96 contains only krypton and nitrogen. Any argon present in the feed stream from line 75 follows the oxygen through column 91.

Only two columns 91 are required for oxygen separation as the first column 91 is ready for another separation step when the second column 91 completes its feed cycle. However, after extended operation the back-purge does not completely remove all of the adsorbed krypton and krypton will start to break through the column 91 during the feed cycle. To prevent this, the columns 91 are given an extended back-purge cycle of about 6 minutes duration after they complete approximately 30 cycles of normal operation. Thus, every three hours there is an additional flow of nitrogen in the back-purge line 95 for an extra 3.0 minutes. In order to allow for this extended purge cycle without interrupting continuous operation, a third oxygen separation column 91 may be added.

Most of the reject oxygen and nitrogen from columns 91, which are now free of all radioactive contaminants can be vented to the atmosphere.

The back-purge flow from oxygen separation vent line 96 varies considerably during the oxygen separation cycles. Therefore, an additional blower 97 and surge tank 98 are used to ensure that the off-gas flow through feed line 100 to krypton separation means 110 is relatively uniform. A flow regulator (not shown) is installed at the outlet of surge tank 98 for this purpose.

The average concentration of krypton in the krypton-nitrogen gas mixture exiting surge tank 98 is approximately 150 ppm. To concentrate the krypton to a suitable concentration for storage, the gas mixture is introduced into a cooler 99 to reduce its temperature to about $-150°$ C. The gas mixture is then introduced onto an adsorbent bed of silver-exchanged synthetic mordenite disposed within krypton separation columns 111. Columns 111 are cooled by coolers 113 to a temperature sufficient to adsorb krypton, about $-140°$ to $-160°$ C.

At least two krypton separation columns 111 are used, one for receiving the off-gas stream from line 100 while the other is in various stages of desorption or standby. The column 111 diameter should be large enough to allow a linear face velocity of approximately 9.15 m./min. or less to obtain reasonably high loading times. An alternative is to use longer adsorbent columns with higher face velocities to obtain equivalent loading times. Utilizing a face velocity of approximately 13.7 m./min. and 1.525 m. long column, a loading time of about 3 hours is obtained when the adsorbent disposed within krypton separation columns 111 is maintained at about $-140°$ to $-160°$ C.

The operation of columns 111 is as follows: The feed gas from surge tank 98 is initially cooled to about $-150°$ C. by passing said gas through a double-walled, liquid nitrogen cooled, coiled heat exchanger 99 prior to entering the on-line krypton separation column 111. Line 100 is interlocked such that as the on-line column 111 feed line 100 is closed, the standby column 111 feed line 100 is opened. Furthermore, the column 111 exit line 114 is similarly interlocked with the feed line 100 so that as the feed line 100 is closed, so too the exit line 114 on the same column 111 is closed. The gas exiting a column 111 through line 114 is purified nitrogen and may be collected for reuse in a closed loop nitrogen recycle system such as hereafter described. After a column 111 has been loaded, the respective vent line 116 is opened and heat is applied to the column by means of external plant heaters 112. After the interior temperature of the column 111 reaches predetermined temperature, preferably about 150° C., the back-purge line 115 is opened and a heated stream of nitrogen gas, heated by heater 119 to about 150° C., is used to back-purge the column 111. Column 111 is heated and thus remains at about 150° C. during the desorption cycle. The back-purge flow rate is approximately 1/10th that of the adsorption or feed-flow rate. The back-purge is continued until the desorbed krypton concentration exiting through vent line 116 is either approximately 200 ppm. or for a selected period of time. While some krypton will exit through line 114 with the nitrogen purge gas, the level of krypton concentration is less than about 0.5 ppm. In any event, this is insignificant inasmuch as the forward-purge flow is recycled back to blower 117 and surge tank 119.

At the completion of the desorption cycle, the column 111 is cooled back down to the preferred krypton adsorption temperature by means of liquid nitrogen passing through cooling lines 113.

The process next provides means 130 for concentrating the krypton component of the gas carried by line 116, said means comprising at least one krypton concentration column 131. Briefly, the desorbed krypton and nitrogen purge gas mixture from columns 111 is directed through a cooler 121 whereby to reduce the gas mixture temperature to about $-140°$ C. The discharge from cooler 121 through line 122 to krypton concentration column 131 is discontinuous because there is only flow therein when the krypton separation columns 111 are back-purged. Therefore, the overall flow to column 131 is approximately 1/30th of that of the krypton separation columns 111. Also, only one column 131 is necessary. Because column 131 is required to accommodate only about 1/30th of the amount of flow to the krypton separation columns 111, the dimensions of column 131 are considerably less than those of columns 111. Column 131 diameter should be large enough to allow about a 9.15 m./min. face velocity therethrough because it contains therein the same silver-exchanged synthetic mordenite adsorbent. The adsorbent is cooled to about $-140°$ to $-160°$ C. by means of liquid nitrogen passing through cooling lines 133. The length of column 131 is somewhat arbitrary and depends upon how many discharges from krypton separation columns 111 are desired per column 131 loading.

As with krypton separation columns 111, there is no need for a forward-purge cycle because the feed gas to column 131 comprises a two component system, i.e., krypton and nitrogen. Therefore, the operation of column 131 is relatively simple. Briefly stated, feed line 122 is opened when one of the krypton separation columns 111 back-purge vent lines 116 is opened. The krypton concentration column 131 column exit line 134 is interlocked with the inlet line 122 so that as one opens or closes so does the other. As column 131 becomes loaded, which may be after one or more discharges from krypton separation columns 111, the contents of column 131 are discharged through vent line 136 and directed to a krypton freeze-out trap 137.

After column 131 becomes loaded, inlet line 122 and outlet line 134 are closed, the back-purge vent line 135 is opened, and column 131 temperature raised by means of external clamp heaters 132 to approximately 150° C. Nitrogen co-adsorbs with krypton at the low adsorption temperatures maintained within column 131 and desorbs at a lower temperature; therefore, as the column 131 temperature is raised the first gas to desorb, which is nitrogen, is directed through a by-pass valve 140 to line 138 for return to vlower 80. As the krypton concentration builds in the desorbed gas, which can be determined by either direct krypton concentration measurement or estimated by the temperature of the adsorbent bed within column 131, by-pass valve 140 redirects the gas flow to a krypton freeze-out trap 137 cooled to about $-185°$ to $-195°$ C. Most of the krypton and some of the nitrogen is collected in freeze-out trap 137 and the remaining gas recycled through line 138 back to blower 80.

As the temperature of column 131 is raised, nitrogen gas, heated to about 150° C. by heater 119, is used to back-purge the krypton gas to freeze-out trap 137 at a flow rate approximately 1/10th that of the column 131 loading rate. Desorption is generally complete when the internal bed temperature of column 131 reaches about 150° C. At the completion of the desorption cycle, column 131 is isolated by closing back-purge line 135 and line 136 and the column is cooled to approximately $-140°$ to $-160°$ C. with cooling coils 133 prior to the next adsorption or load cycle.

When the desorbed gas from krypton concentration column 131 has been collected in freeze-out trap 137, back-purge vent line 134 is closed and blower 117 is used to recycle any gaseous nitrogen or untrapped krypton. When freeze-out trap 137 is warmed, the collected krypton can be transferred and/or compressed for steel cylinder 139 storage or other disposition.

Both the forward and back-purge of oxygen separation columns 91, and the back-purge for krypton separation columns 111 and krypton concentration column 131 utilize nitrogen from the recycle nitrogen surge tank 118. The only appreciable loss to the system is the 0.5 minute forward-purge to the oxygen separation columns 91. This, of course, is mitigated to a substantial degree by recycling the exit gas from the oxygen separation columns 91 back to blower 40 providing purge gas for water removal columns 31, $CO_2$ removal columns 51, and and xenon removal columns 71. In order that an adequate supply of nitrogen is available within the nitrogen recycle system, an external supply 120 of nitrogen gas is provided. Alternatively, the recovered gaseous nitrogen from the liquid nitrogen supply to cooler 113 and 133 may be used to compensate for the loss.

With the use of the process shown in FIG. 1 and herebefore described, the results obtained during demonstration tests are summarized in Table 1. As noted in the table, approximately 10% of the $CO_2$ present in the feed gas co-adsorbed on the Type 3A adsorbent and was desorbed with the water during the regeneration cycle. Although essentially all of the water and carbon dioxide could be collected in a liquid nitrogen-cooled freeze-out trap, this was not done. The xenon can also be recovered in this manner, essentially quantitatively. The recovered water and co-adsorbed $CO_2$ could be recycled back to the dissolver off-gas stream.

The measurement sensitivities were about 0.1 ppm. for $CO_2$ and $H_2O$, 0.5 ppm. for krypton and xenon, and about 10 ppm. for $O_2$. In measuring the concentrations of $H_2O$ and $CO_2$ in the effluents from their respective removal columns, the concentrations in both cases would be several ppm. immediately after the column was put in service, then slowly decreased to below background until the beds were loaded. No significant amounts of krypton or xenon were measured in the $H_2O$ and $CO_2$ effluents during desorption.

A spike of krypton was detected in the xenon desorption effluents, but the average krypton concentration in the xenon was only a fraction of a ppm. The concentration of xenon in the gas entering the oxygen separation columns was below detection limits. Because in all these cases the concentration of the respective gases were below the detection limits, "greater than" DFs are reported. In the case of krypton, the concentration of krypton in the $O_2$ and $N_2$ effluents from the krypton separation and concentration columns were below the detection limits, the overall systems DF for krypton was determined to the better than 400. The average CF for both the krypton separation and concentration columns were on the order of about 30 to 35 each, resulting in concentration of krypton to the freeze-out trap on the order of about 1 to 20%. By proper adjustment of temperature and pressure, krypton concentrations as great as about 90% could be obtained in a storage vessel.

Based upon the foregoing, it is apparent that the present invention has several important advantages over processes heretofore proposed and used for treatment of effluents from nuclear fuel reprocessing plants and other nuclear processes. The process integrates each of the steps in such a way that each is compatible with the next. The process does not introduce or result in a significant aqueous waste stream that may require additional treatment. The separations are all effected at substantially ambient pressure and only the krypton separation and concentration steps require cryogenic cooling. It is also to be noted that the collected waste products are sufficiently concentrated to be acceptable for long term storage, though additional treatment will be necessary to convert the waste to acceptable storage forms. The decontamination factors resulting from the process are greater than those which are required or anticipated to meet existing and pending governmental regulations. Furthermore, the process does not require the development of new equipment or instruments and the estimated capital and operating costs are much less than for other processes.

While various preferred embodiments of the invention have been shown and described herein, it will be apparent that various changes, rearrangements and modifications may be made therein without departing from the scope of the invention as defined in the appended claims. Therefore, to the extent that such variant forms of the invention are possible, they are considered to be encompassed within the scope and essence of the invention.

We claim:

1. A method for selectively removing xenon in gas phase from a nuclear process off-gas stream which contains at least one other gas selected from the group consisting of krypton, oxygen, and nitrogen, said method comprising the step of directing said stream through an adsorbent bed containing silver-exchanged synthetic mordenite zeolite while maintaining said stream at about ambient temperature and pressure.

2. A method for selectively removing xenon and krypton in gas phase from a nuclear process off-gas stream which contains at least one other gas selected from the group consisting of oxygen and nitrogen, said method comprising the sequential steps of:

(a) directing said stream through a first adsorbent bed containing silver-exchanged synthetic mordenite zeolite while maintaining said stream at about ambient temperature and pressure whereby to selectively remove the xenon component of said stream; and (b) then directing the xenon-free stream emitted from the outlet end portion of said first bed through a second adsorbent bed containing silver-exchanged synthetic mordenite zeolite while maintaining said xenon-free stream at about ambient temperature and pressure whereby to selectively remove the krypton component thereof.

3. A method as set forth in claim 1 wherein said silver-exchanged synthetic mordenite zeolite is prepared from hydrogen-form synthetic mordenite zeolite.

4. A method as set forth in claim 2 wherein said silver-exchanged synthetic mordenite zeolite is prepared from hydrogen-form synthetic mordenite zeolite.

* * * * *